UNITED STATES PATENT OFFICE.

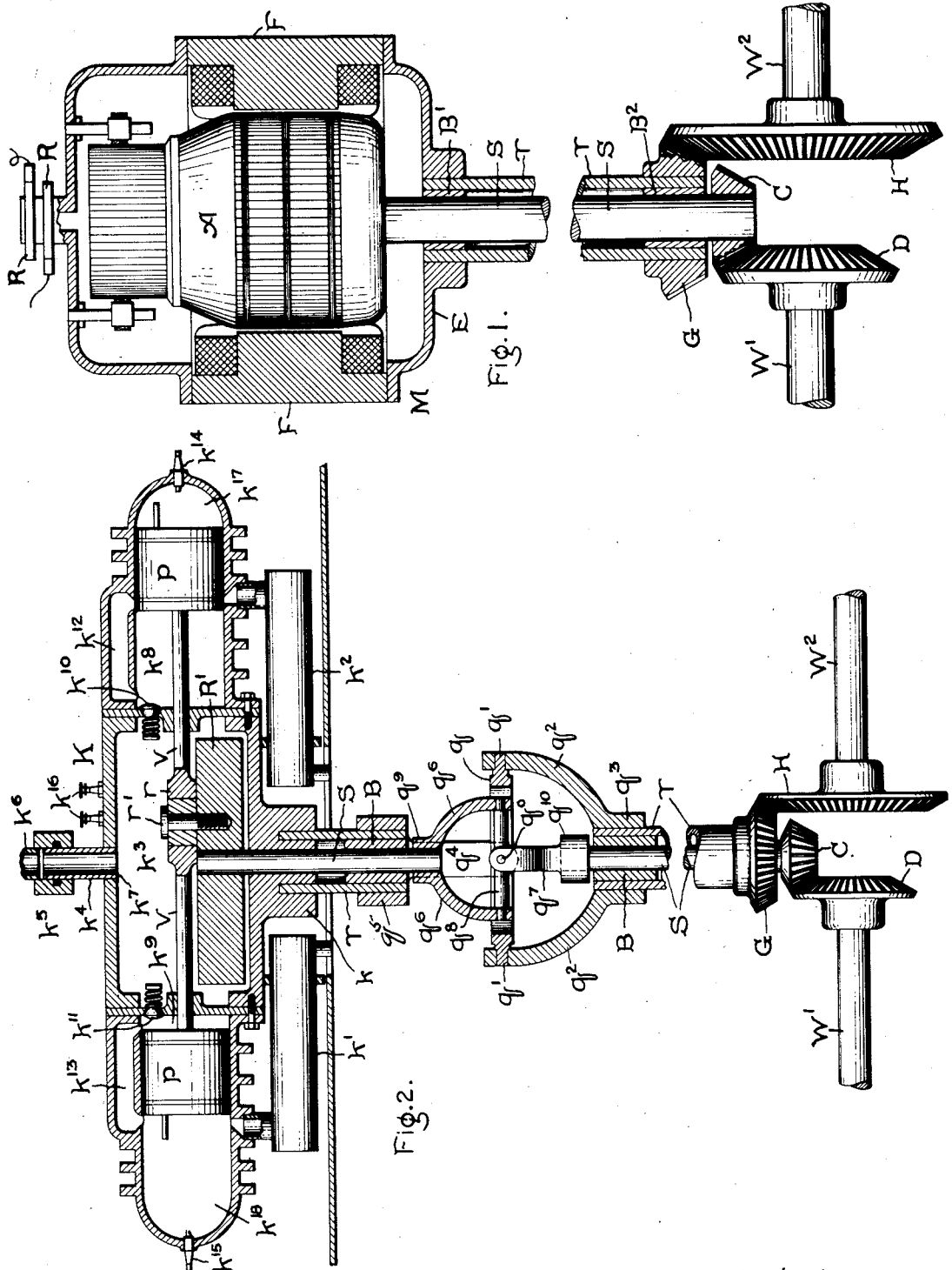

HAROLD V. GREEN, OF CHICAGO, ILLINOIS, ASSIGNOR TO GENERAL ELECTRIC COMPANY, A CORPORATION OF NEW YORK.

DIFFERENTIAL DRIVING MECHANISM.

1,143,537.          Specification of Letters Patent.      Patented June 15, 1915.

Application filed September 23, 1913. Serial No. 791,408.

*To all whom it may concern:*

Be it known that I, HAROLD V. GREEN, a citizen of the United States, residing at Chicago, in the county of Cook, State of Illinois, have invented certain new and useful Improvements in Differential Driving Mechanisms, of which the following is a specification.

My invention relates to the transmission of power and more especially to transmission gearing and driving means for vehicles.

It has for its objects, first the provision of a differential driving mechanism which shall replace and render superfluous the ordinary differential gearing, and second the improvement in certain structural details of transmission shafts and couplings.

Briefly stated, my invention contemplates the provision of a motor provided as usual with two elements, a rotor and stator. This motor may be gasolene or electric, or for that matter pneumatic or hydraulic. Instead of having the stator fixed however, I make both elements movable, by virtue of their mutual reaction, and I then gear each element to one of the associated driven parts, as for example the opposite driving wheels of a vehicle. This brings about automatic compensation equivalent to that produced by the ordinary differential gearing, when one driven part moves at a higher speed than the other. In applying this principle to the drive from an internal combustion engine, I have found it necessary to make the entire engine rotate in one direction, while the fly wheel of the shaft rotates in the other. A secondary advantage of such an arrangement is that by lowering the working speeds, it renders regulation much easier and more effective.

A characteristic feature of my invention is the location of the motor in one end of the vehicle, as for example under the hood of an automobile, transmitting power to the rear or driving wheels by means of a substantially horizontal shaft of novel construction. There being a duplex drive involved, I make the shaft with a solid core and a hollow sleeve, both carrying gears at one end and each secured to one of the motor elements at the other. At some point in the length of the shaft I provide a universal joint or coupling which permits a certain amount of play and avoids the necessity of absolute alinement. In this coupling there are four elements, two external on the sleeve shaft and two internal on the core shaft. I consider this arrangement to be original with me.

My invention is illustrated in the accompanying drawings in which:

Figure 1 is a plan view with parts in section, showing an electric motor coupled to two driving shafts through my duplex transmission shaft. Fig. 2 is a similar view showing an internal combustion engine instead of an electric motor, also showing my duplex universal joint or flexible coupling.

In Fig. 1 M represents a motor with a field structure F F and an armature structure A, these two elements adapted to rotate in opposite directions. The motor receives its current through two or more slip rings R R, and coöperating brushes. The armature A is fixed to and supported on a shaft S S which runs in bearings $B'$ $B^2$. These bearings are shown as of solid material, such as Babbitt metal or the like, but I contemplate also making them ball bearings where very light running is required and the expense is justified. The mechanical details of these bearings I have not thought necessary to illustrate but it will be understood that in practice there will be end caps for the tubular shaft, and if balls are used then there would be spacing rings and collars forming race-ways for the balls.

The rotary motion of the armature is transmitted through shaft S S to the bevel gear C fixed on the end of said shaft. This bevel gear transmits its rotary motion to another bevel gear D fixed on the end of the shaft $W'$, shown at right angles to the shaft S S. The field structure F F is fixed to and supported on the tubular shaft T T by the motor end shield E. The shaft T T runs in bearings supported on the frame or chassis of the vehicle as usual, and these bearings I have not deemed it necessary to illustrate since in themselves they form no direct part of the present invention, although they are essential to its proper operation. The rotary motion of the field structure F F is transmitted through tubular shaft T T to the bevel gear G fixed on the end of said shaft. This gear transmits its rotary motion to the bevel gear H fixed on the end of the shaft $W^2$ shown at right angles to the tubular shaft T T and in line with the shaft $W'$.

These two shafts W′ W² are taken as the driving wheel shafts of an automobile, and can be either direct, gear, belt, rope, or otherwise connected to the rear wheels, as common in modern practice. The two driving shafts run in bearings fitted on the running gear or chassis of the vehicle, as will be readily understood, and I have considered it unnecessary to illustrate these bearings, which can readily be supplied by anyone skilled in the art.

The operation of the arrangement thus described is as follows: From the opposite directional rotation of the armature structure A and the field structure F F there results an opposite directional rotation of the gears C and G. From the opposite directional rotation of the gears C and G there results a similar directional rotation of the shafts W′ and W². From the similar directional rotation of the shafts W′ and W² there results a similar directional rotation of the rear wheels of the automobile. The relative values of these similar directional rotations of the rear wheels of the automobile are dependent upon the curvature of the track pursued, the resistance offered to their rotation and upon the magnitude of the torque transmitted from the motor tending to rotate them. There is thus produced a differential action between the motor and the two wheels, which permits the automobile to turn around a curve without slippage of the rear wheels. This differential action is produced by the foregoing mechanism independent of the differential cycloidal gearing, which is common to all modern automobiles having single motor driving mechanisms.

In Fig. 2 I have shown the application of this principle to an internal combustion engine. Here K represents the case body of the engine, with two or more cylinders joined with their axes radial to a common center, which lies in the axis of the duplex shaft S—T. The entire engine is carried on this shaft or rather on bearings which serve to center the shaft and which are not shown. In case of an engine of high power, however, where a number of cylinders are employed, and the weight is correspondingly increased, I then prefer to provide the engine with its own bearings, bringing out shoulders $k$ on the casing for this purpose. The engine structure also carries with it mufflers $k′$, $k^2$, and its mixing chamber $k^3$ is connected to the carbureter by means of a central pipe $k^4$ whose end works in a packed slip joint $k^5$ connected to the fixed feed pipe $k^6$. The packing in the coupling prevents leakage and as for the carbureter itself, it may be of any standard or desired type which will supply explosive mixture to the chamber $k^3$. If desired I may provide an inward opening check valve at the point $k^7$, but usually this is unnecessary as compression takes place only in the cylinder chambers $k^8$ and $k^9$, into which the explosive mixture is drawn through valves $k^{10}$ and $k^{11}$, after compression being fed into the explosion chamber through ports $k^{12}$, $k^{13}$, which are alternately covered and uncovered as to their opposite ends in the reciprocation of the piston P.

$k^{14}$, $k^{15}$ represent the spark plugs, and the ignition through these plugs can be arranged in any desired manner, for battery or magneto, there being no difference from the ordinary ignition except in the necessity for making a rotating electrical connection for the circuit wires. This I preferably accomplish by means of slip rings on the casing of the engine, with brushes resting thereon as indicated at $k^{16}$.

The cylinders and engine body thus described correspond to the field structure F F of Fig. 1, and while the pistons of necessity travel in a rotary direction with the cylinders, they also have independent reciprocating travel which is changed into the rotary motion of the fly wheel R′ which thus corresponds to the armature of Fig. 1. Motion is communicated to the fly wheel by means of the rods V V and the slotted crosshead $r$ which engages a wrist pin $r′$ on the fly wheel R′. This fly wheel is carried on the solid shaft S and the body of the engine is carried on the tubular shaft T as already stated. The solid shaft turns in the bearings B previously described and at the other end of the shaft bevel gears C and G serve to transmit motion through the gears D and H to the shafts W′ and W² respectively.

Disregarding the universal coupling for the moment, the operation may be stated as follows: Explosive mixture from the carbureter is supplied through the pipes $k^6$, $k^4$, to the mixing chamber $k^3$, and we will assume the pistons to be in the position shown in Fig. 2. A charge is then compressed in the explosive chamber $k^{17}$, and a dead charge is exhausting from the chamber $k^{18}$ through the muffler $k′$. A compressed charge from the chamber $k^9$ is passed through the port $k^{13}$ to recharge and incidentally to scavenge the chamber $k^{18}$. The chamber $k^8$ is filled with a fresh charge sucked in through the valve $k^{10}$ and ready for compression. If now the piston is moved to the left, the fly wheel R′ will turn in one direction, the body of the engine will turn in the other direction, and the shafts S—T will turn in opposite directions communicating unidirectional motion to the shafts W′ and W². The charge in the chamber $k^{18}$ is finally compressed ready for explosion, the charge in the chamber $k^8$ is initially compressed ready for passage into the explosion chamber $k^{17}$ at the end of the stroke, and incidentally a fresh charge is drawn into the chamber $k^9$ through the valve $k^{11}$. At the end of the stroke, explosion takes place in the chamber $k^{18}$ and simultaneous exhaust from the chamber $k^{17}$, whereupon all the preceding operations are reversed, but the opposite directional rotations of the motor body and fly wheel continue.

It will be obvious that the number of cylinders employed in this engine may be increased at will, and an advantage is found in the fact that the speed of the engine parts is reduced one-half from that in ordinary engines, whereby wear and the cost of maintenance are greatly reduced.

Turning now to the coupling which is the last feature to be described, this consists in the following elements: The universal joint which I have designed to use with my duplex shaft is a modified form of gimbal joint. A ring $q$ has trunnions $q'$ pivoted in the ends of a pair of curved arms $q^2$ projecting from a collar $q^3$ secured on one part of the shaft T. At right angles to the trunnions $q'$ the ring carries a pair of similar trunnions which are pivoted in the ends of curved arms $q^4$ carried by a collar $q^5$ on the other part of the tubular shaft T. Only one of the pair of arms $q^4$ is shown in Fig. 2.

The ring $q$ is made of large enough diameter to take within it the ends of two pairs of arms $q^6$ and $q^7$, whose ends receive the tips $q^0$ of a cross-pintle $q^8$. The arms $q^6$ are carried on a collar $q^9$ secured on one part of the shaft S and the arms $q^7$ are carried on a collar $q^{10}$ carried on the other part of the shaft S. The bearings B have already been described, and the pintle $q^8$ is lined up thereby as to its axis, and is longitudinally adjusted so that the center of intersection of its pintles coincides with the center of the ring $q$, which is also at point of intersection of the axes of the trunnions $q'$. From this construction and arrangement it follows that any flexing of the joint must be on a common center, and as all parts maintain their individual distances from said center, in all positions of the shaft, their positions with respect to each other remain constant. Hence the mutual alinement of the two shafts remains perfect at all times, without any undue friction or strain on the bearings.

Divers changes may be made in the details of construction, and in the connections and bearings on the vehicle, without departing from the spirit of my invention; and I wish it understood that I contemplate all such non-essential changes and modifications as fairly fall within the scope of the appended claims.

What I claim as new and desire to secure by Letters Patent of the United States, is:—

1. Means for generating and transmitting power comprising a motor having two mutually reactive elements adapted to rotate in opposite directions, a duplex shaft comprising a core shaft connected to one motor element, a tubular shaft connected to the other element and journaled concentrically around the core shaft, concentric pinions fixed on the two shafts, a pair of gears engaging said pinions for unidirectional rotation, and a duplex universal joint in the shaft, with one element connecting the core shaft and the other element connecting the surrounding tubular shaft, both elements of said universal joint being concentric and adapted to maintain the relations of all the parts constant in all positions.

2. Means for generating and transmitting power comprising a motor having a plurality of moving elements, a duplex shaft for transmitting power from said motor to the driven parts, and a concentric duplex universal joint in said shaft.

3. A differential motor driving mechanism for vehicles comprising a motor having two mutually reactive elements adapted to rotate in opposite directions, a duplex shaft having a core shaft connected to one element of the motor and a concentric tube journaled on the core and connected to the other element of the motor, a pair of beveled gears fixed concentrically on the core and tube respectively, a pair of associated driving shafts journaled with their axis alined and perpendicular to the axis of the duplex transmission shaft, and a pair of beveled gears fixed on said driving shafts, engaging the respective gears of the duplex shaft on opposite sides, whereby power will be communicated to said driving shafts unidirectionally but with differential effect.

In witness whereof, I have hereunto set my hand this 20th day of September 1913.

HAROLD V. GREEN.

Witnesses:
A. W. MONROE,
E. W. ALLEN.